(12) United States Patent
Bannai

(10) Patent No.: US 12,463,284 B2
(45) Date of Patent: Nov. 4, 2025

(54) BATTERY PACK AND ELECTRIC TOOL

(71) Applicant: MURATA MANUFACTURING CO., LTD., Kyoto (JP)

(72) Inventor: Yoshiyuki Bannai, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 715 days.

(21) Appl. No.: 17/949,639

(22) Filed: Sep. 21, 2022

(65) Prior Publication Data
US 2023/0013558 A1 Jan. 19, 2023

Related U.S. Application Data

(63) Continuation of application No. PCT/JP2021/010132, filed on Mar. 12, 2021.

(30) Foreign Application Priority Data

Mar. 24, 2020 (JP) .................. 2020-052357

(51) Int. Cl.
*H01M 50/296* (2021.01)
*H01M 50/213* (2021.01)
(Continued)

(52) U.S. Cl.
CPC ....... *H01M 50/296* (2021.01); *H01M 50/213* (2021.01); *H01M 50/24* (2021.01);
(Continued)

(58) Field of Classification Search
CPC ........... H01M 2220/30; H01M 50/296; H01M 50/213; H01M 50/24; H01M 50/247; H01M 50/548; Y02E 60/10
See application file for complete search history.

(56) References Cited

U.S. PATENT DOCUMENTS

2008/0081252 A1 4/2008 Miyazaki
2013/0082659 A1* 4/2013 Kano .................. H01M 50/213
307/66

(Continued)

FOREIGN PATENT DOCUMENTS

JP 2008091182 A 4/2008
JP 2010015906 A 1/2010

(Continued)

OTHER PUBLICATIONS

1 Chinese Office Action issued Oct. 30, 2023 in corresponding Chinese Application No. 202180022270.0.
(Continued)

*Primary Examiner* — Kiran Quraishi Akhtar
(74) *Attorney, Agent, or Firm* — K&L Gates LLP

(57) ABSTRACT

Provided is a battery pack including: an exterior case; a cylindrical battery cell including a positive electrode terminal part at one end and a negative electrode terminal part at the other end; and a metal plate connected to the positive electrode terminal part or the negative electrode terminal part, where the battery cell has a peripheral protrusion around the positive electrode terminal part or the negative electrode terminal part, the metal plate has a protrusion that faces the peripheral protrusion, and the protrusion is disposed in close contact with the whole periphery of the peripheral protrusion, with a first insulating part interposed therebetween.

10 Claims, 11 Drawing Sheets

(51) Int. Cl.
*H01M 50/24* (2021.01)
*H01M 50/247* (2021.01)
*H01M 50/548* (2021.01)

(52) U.S. Cl.
CPC ....... *H01M 50/247* (2021.01); *H01M 50/548* (2021.01); *H01M 2220/30* (2013.01)

(56) References Cited

U.S. PATENT DOCUMENTS

2019/0067655 A1 2/2019 Nakamura et al.
2020/0176731 A1 6/2020 Taga

FOREIGN PATENT DOCUMENTS

| | | |
|---|---|---|
| JP | 2012-033395 | 2/2012 |
| JP | 2012045121 A | 3/2012 |
| JP | 2013073864 A | 4/2013 |
| JP | 2020087874 A | 6/2020 |
| WO | 2017175487 A1 | 10/2017 |

OTHER PUBLICATIONS

International Search Report of corresponding PCT application PCT/JP2021/010132, dated Jun. 1, 2021.

* cited by examiner

A

B

A

B

A

B

BATTERY PACK AND ELECTRIC TOOL

CROSS REFERENCE TO RELATED APPLICATIONS

The present application is a continuation of PCT patent application no. PCT/JP2021/010132, filed on Mar. 12, 2021, which claims priority to Japanese patent application no. JP2020-052357, filed on Mar. 24, 2020, the entire contents of which are herein incorporated by reference.

BACKGROUND

The present application relates to a battery pack and an electric tool.

Battery packs in which a battery cell group that has a plurality of battery cells such as lithium ion secondary battery cells electrically connected is housed in an exterior case are widely used for electric vehicles, electric tools, and the like. Entry of moisture into the battery packs causes damage to the battery cells. Thus, the battery packs are required to have waterproofness improved.

A structure is proposed where a double-sided tape that covers the periphery of an electrode surface of a battery pack is attached, a metal plate (lead plate or tab plate) is attached onto the double-sided tape, and a waterproof resin layer that covers the battery electrode surface and a peripheral region thereof is provided on the metal plate.

A structure is proposed where an elastic body with an opening is disposed between a battery positive electrode part and a battery holder (exterior case) opening, a predetermined part of the elastic body is sandwiched between an end surface near the battery positive electrode part and a holder inner surface, and a part of the elastic body exposed from the opening of the battery holder is sandwiched between the battery positive electrode part and a lead plate.

SUMMARY

The present application relates to a battery pack and an electric tool.

The techniques proposed and referenced above require new components and configurations, there is room for improvement from the viewpoint of regulating the addition of the number of components. In addition, the techniques proposed have room for improvement from the viewpoint of avoiding waterproofness decreased when a new component is a missing part or when the position where a new component is installed is deviated.

The present application relates to improving the waterproofness of a battery pack without adding a new member or configuration according to an embodiment.

The present application provides a battery pack including: an exterior case; a cylindrical battery cell including a positive electrode terminal part at one end and a negative electrode terminal part at the other end; and a metal plate connected to the positive electrode terminal part or the negative electrode terminal part, where the battery cell has a peripheral protrusion around the positive electrode terminal part or the negative electrode terminal part, the metal plate has a protrusion that faces the peripheral protrusion, and the protrusion is disposed in close contact with the whole periphery of the peripheral protrusion, with a first insulating part interposed therebetween according to an embodiment.

In addition, the battery pack according to the present application may be included in an electric tool according to an embodiment.

According to the present application, the waterproofness of the battery pack can be improved without adding a new member or configuration.

DETAILED DESCRIPTION

One or more embodiments of the present application will be described below in further detail including with reference to the figures.

It is to be noted that the present application is not limited thereto. In the following description, directions such as frontward and backward, leftward and rightward, and upward and downward directions are indicated in consideration of convenience of description, but the contents of the present application are not to be considered limited to these directions.

Figure 1:
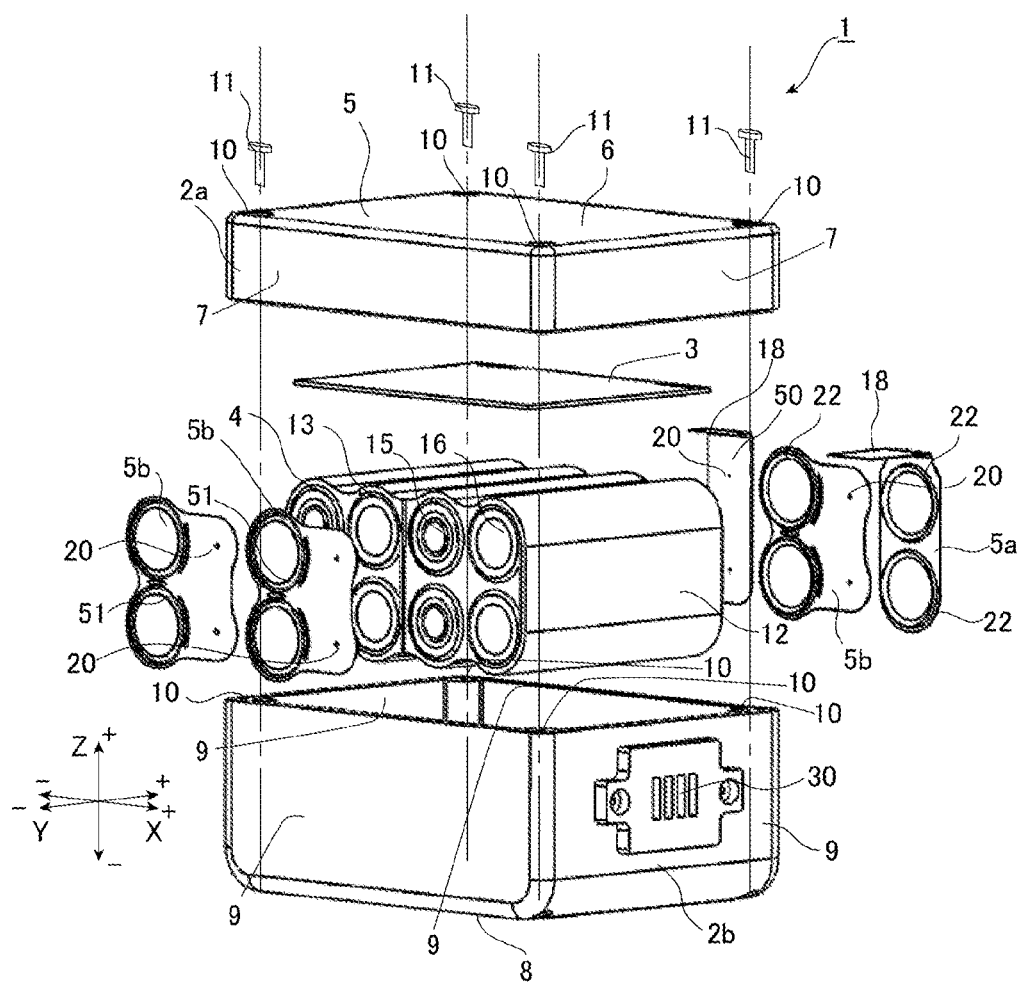
FIG. 1 is an exploded perspective view for illustrating a battery pack according to a first embodiment.
Figure 2:
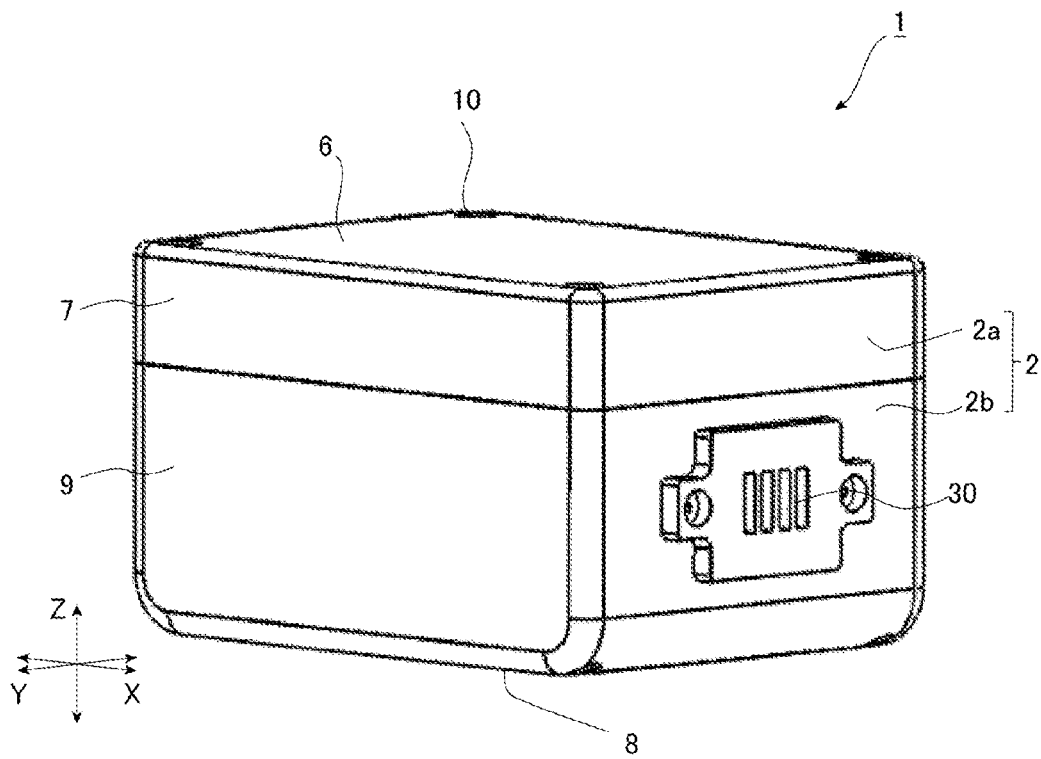
FIG. 2 is a perspective view for illustrating an exterior case of the battery pack.

A specific example of and a preferred example of a battery pack (battery pack 1) according to the first embodiment will be described with reference to FIGS. 1 to 10. FIG. 1 is an exploded perspective view for illustrating a configuration example of the battery pack 1. FIG. 2 is a perspective view for illustrating an external appearance of the battery pack 1. For example, as illustrated in FIGS. 1 and 2, the battery pack 1 according to the first embodiment includes an exterior case 2, a circuit board 3, a battery cell 4, and a metal plate 5, and the circuit board 3, the battery cell 4, and the metal plate 5 are housed in the exterior case 2.

As illustrated in FIGS. 1 and 2, the exterior case 2 has an upper case 2a and a lower case 2b. The upper case 2a and the lower case 2b are engaged and then integrated to form the exterior case 2. In the example illustrated in FIGS. 1 and 2, the upper case 2a has a substantially rectangular upper-face plate 6. From the whole periphery of the outer edge of the upper-face plate 6, a side-face plate 7 is provided downward (in the −Z direction in FIG. 1). The side-face plate 7 is provided from each of the four sides of the upper-face plate 6. The depth of the upper case 2a is not to be considered particularly limited, but is formed to be shallower than the depth of the lower case 2b in the examples of FIGS. 1 and 2.

The lower case 2b has a substantially rectangular bottom-face plate 8. From the whole periphery of the outer edge of the bottom-face plate 8, a side-face plate 9 is provided upward (in the +Z direction in FIG. 1). The side-face plate 9 is provided from each of the four sides of the bottom-face plate 8. The predetermined side-face plate 9 is provided with an external connection terminal 30.

Each of the upper case 2a and the lower case 2b has screw-tightening holes 10 formed. The holes 10 of the lower case 2b are formed at positions that face the holes 10 of the upper case 2a. In the example of FIG. 1, the holes 10 are formed at four corners of the upper case 2a and lower case 2b, and the holes 10 are also formed at four corners of the exterior case 2. Screws 11 are inserted into the respective holes 10, and then rotated. The screws 11 penetrate the holes 10 of the upper case 2a and then reach the holes 10 of the lower case 2b. Furthermore, the screws 11 are rotated for screw fastening to fasten the upper case 2a and the lower case 2b.

Figure 3:
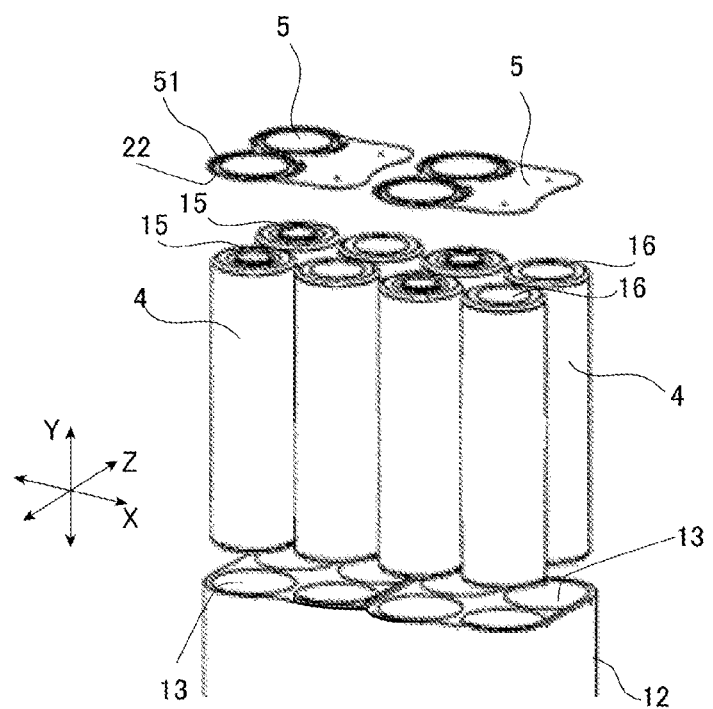
FIG. 3 is a block diagram illustrating a configuration example of a battery holder according to the first embodiment.

In the internal space of exterior case 2, a battery holder 12 is housed. The battery holder 12 has, as illustrated in FIG. 3, a plurality of battery cell housing units 13 formed. The battery cell housing unit 13 is formed in, for example, a tubular shape. The axial direction of the battery cell housing unit 13 corresponds to the horizontal direction (Y direction) with the battery holder 12 housed in the exterior case 2. Ends that face each other in the axial direction of the battery cell housing unit 13 are open, for example, in a substantially circular shape.

In addition, in the battery holder 12, the battery cell housing units 13 are formed side by side in the vertical direction (Z direction) and the front-back direction (X direction). In the example illustrated in FIGS. 1 and 2, the battery cell housing units 13 are arranged in four rows in the front-back direction and in two rows in the vertical direction, and a battery cell 4 is housed in each of the units. It is to be noted that this example is an example, and the number of rows in the front-back direction and the number of rows in the vertical direction for the battery cell housing units 13 are not limited to the example illustrated in FIG. 1 and the like. In addition, the number of battery cells housed in one battery cell housing unit 13 is not limited to one.

As a material for the battery holder 12, for example, an insulating material is suitably used, and specifically, a resin such as a plastic is used.

The battery cell 4 is a battery that has a cylindrical shape, and for example, a cylindrical lithium ion secondary battery as described later can be employed. The battery cell 4 may be another secondary battery such as a lithium ion polymer secondary battery.

Electrode terminal parts are formed respectively on both end surfaces of battery cell 4. One end surface of the battery cell 4 has a positive electrode terminal part 15 formed thereon as an electrode terminal part, whereas the other end surface of the battery cell 4 has a negative electrode terminal part 16 formed thereon as an electrode terminal part. The positive electrode terminal part 15 or negative electrode terminal part 16 of the battery cell 4 is exposed from an opening formed at an end of the battery cell housing unit 13, with the battery cell 4 housed in the battery cell housing unit 13.

Regarding the arrangement of the plurality of battery cells 4 housed in the battery cell housing unit 13 of the battery holder 12, as shown in FIG. 3 and the like, the battery cells 4 adjacent in the vertical direction (Z direction) are arranged such that the electrode terminal parts exposed to the same face side of the battery holder 12 are identical in polarity to each other. For example, the positive electrode terminal part 15 of the battery cell 4 disposed on the upper side and the positive electrode terminal part 15 of the battery cell 4 disposed on the lower side are disposed so as to face the same direction. The battery cells 4 adjacent in the front-back direction (X direction) are arranged with such that the electrode terminal parts exposed to the same face side of the battery holder 12 are different in polarity. For example, when a combination of a plurality of battery cells 4 housed in the battery holder 12 is viewed with the direction (Y direction) from one end-surface side of the battery cells 4 to the other end-surface side thereof as a line-of-sight direction, the battery cells 4 are arranged such that the positive electrode terminal parts 15 and the negative electrode terminal parts 16 are alternately arranged. It is to be noted that the above-described arrangement of the battery cells 4 is an example, and is not limited to the arrangement exemplified in FIG. 3 and the like.

Figure 10:
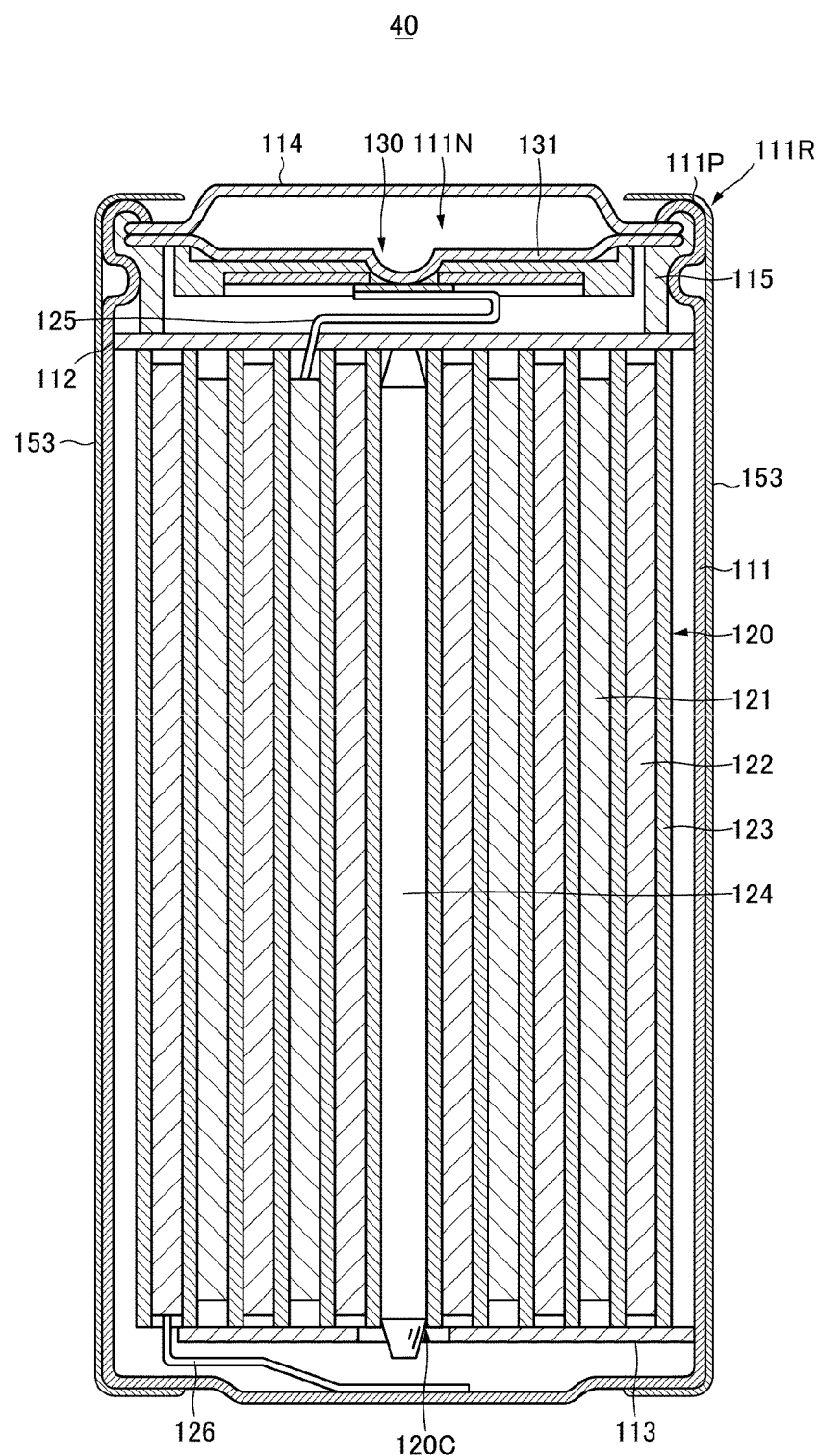
FIG. 10 is a schematic sectional view illustrating a structure example of a battery cell.

As will be described later with reference to FIG. 10 and the like, the battery cell 4 is formed in a shape that has a battery cover disposed on the opening side of a battery can that is open to one side, where a part protruding toward the central part of the battery cover is formed, and this part forms the positive electrode terminal part 15. As illustrated in the examples of FIGS. 10, 5A, and 5B, a crimped structure for the battery can is formed at an outer peripheral end of the positive electrode terminal part 15, and a part that forms the crimped structure serves as a peripheral protrusion 21. The peripheral protrusion 21 has a protruding end 32 protruding in the same direction as the protruding direction of the positive electrode terminal part 15, and forms an inclined part curved and inclined in both inward and outward directions from the protruding end 32. In FIGS. 5A and 5B, reference numeral 33 denotes an outer inclined part curved and inclined outward from the protruding end 32. It is to be noted that a diagram where the metal plate 5 and the battery cell 4 are not joined with the metal plate 5 disposed to face the battery cell 4 is shown in FIGS. 5A and 5B for convenience of description. The same applies to FIGS. 8 and 9B.

For the battery cell 4, the outer peripheral surface of the battery can be described later with reference to FIG. 10 and the like is covered with a first insulating part 23 such as an insulating tube, and the condition where the outer peripheral exposed surface of the battery cell 4 is formed by the first insulating part 23 is formed as illustrated in FIGS. 5A and 5B. In addition, the first insulating part 23 is provided so as to cover at least the peripheral protrusion 21. In the examples of FIGS. 10, 5A, and 5B, the first insulating part 23 forms the outer peripheral exposed surface of the battery cell 4, further covers the peripheral protrusion 21 from the outer peripheral surface of the battery cell 4, also wraps around the end-surface side of the battery cell 4, and extends from the protruding end 32 of the peripheral protrusion 21 toward the positive electrode terminal part 15. The extended end of the first insulating part 23 is located between the positive electrode terminal part 15 and the peripheral protrusion 21.

In the battery pack 1, the first insulating part 23 is provided as described above, thereby maintaining the insulated condition between a protrusion 22 of the metal plate 5 and the peripheral protrusion 21.

The battery cell 4 may further be provided with a washer 31. The washer 31 is an insulating member formed in an annular form, and is disposed on the outer periphery of the positive electrode terminal part 15. As illustrated in FIG. 5B, the washer 31 has an outer peripheral edge positioned on the part where the peripheral protrusion 21 is formed, the washer 31 has an inner peripheral edge positioned between the positive electrode terminal part 15 and the peripheral protrusion 21, and the inner peripheral edge is positioned closer to the positive electrode terminal part 15 than the extended end of the first insulating part 23.

In the battery pack 1, the washer 31 is further provided, thereby more firmly maintaining the insulated condition between the protrusion 22 of the metal plate 5 and the peripheral protrusion 21.

The electrode terminal parts (positive electrode terminal part 15 and negative electrode terminal part 16) exposed from the openings of the battery cell housing units 13 of the battery holder 12 are joined to a metal plate.

In the examples of FIGS. 1 and 2, the electrode terminal parts are joined to the metal plate 5 and the metal plate 50 at one face of battery holder 12, and bonded to metal plate 5 at the other face of battery holder 12. The metal plate 5 is a positive electrode joining-type metal plate joined to the positive electrode terminal part 15 to form a terminal contact part 19. Examples of the metal plate 5 include two types of: a positive electrode limitedly joining-type metal plate joined to only the positive electrode terminal part 15; and a bipolar electrode joining-type metal plate also bonded to the negative electrode terminal part 16. Regarding the metal plate 5, the positive electrode limitedly joining-type metal plate may be referred to as a first metal plate 5a, and the bipolar electrode joining-type metal plate may be referred to as a second metal plate 5b. The metal plate 50 is a negative electrode limitedly joining-type metal plate joined to only the negative electrode terminal part 16.

The first metal plate 5a is joined to the positive electrode terminal parts 15 and 15 exposed from the openings of the respective battery cell housing units 13 adjacent to each other in the vertical direction on the front-end side (in a direction close to the external connection terminal 30 as viewed in the front-back direction (+X direction in FIG. 1)) at one face (face on the +Y-direction side in FIG. 1) of the battery holder 12.

The metal plate 50 is attached to the same face side as the installation surface of the first metal plate 5a in the battery holder 12, and joined to the negative electrode terminal parts 16 and 16 exposed from the openings of the respective battery cell housing units 13 adjacent to each other in the vertical direction on the rear-end side (in a direction away from the external connection terminal 30 as viewed in the front-back direction (−X direction in FIG. 1)).

In addition, the second metal plate 5b positioned between the first metal plate 5a and the metal plate 50 is attached to the same face side as the installation surface of the metal plate 50 in the battery holder 12. The second metal plate 5b is joined to the negative electrode terminal parts 16 and 16 and positive electrode terminal parts 15 and 15 exposed from the openings of the four respective battery cell housing units 13 adjacent in the front-back direction (X direction) and the vertical direction (Z direction).

At the other face of the battery holder 12 (the face side opposite to the installation surface of the metal plate 50 in the battery holder 12 (the face on the −Y-direction side in FIG. 1)), the negative electrode terminal parts 16 and positive electrode terminal parts 15 exposed from the openings of the battery cell housing units 13 are joined by two adjacent second metal plates 5b.

One of the second metal plates 5b is joined to the negative electrode terminal parts 16 and 16 and positive electrode terminal parts 15 and 15 exposed from the openings of the two sets of battery cell housing units 13 on the rear-end side among the sets of two battery cell housing units 13 adjacent to each other in the vertical direction.

The other of the second metal plates 5b is joined to the negative electrode terminal parts 16 and 16 and positive electrode terminal parts 15 and 15 exposed from the openings of the two sets of battery cell housing units 13 on the front-end side among the sets of two battery cell housing units 13 adjacent to each other in the vertical direction.

The upper-end sides of the first metal plate 5a and metal plate 50 extend toward the center of the battery holder 12 on the upper surface of the battery holder 12, and the extended parts serve as board connection terminals 18 and 18. The board connection terminals 18 and 18 of the first metal plate 5a and metal plate 50 are electrically connected to the circuit board 3 placed on the upper surface of the battery holder 12.

The combination and arrangement of the metal plates 5 and 50, the shape of the individual metal plates 5 and 50, and the like can be appropriately set depending on the arrangement of the negative electrode terminal parts 16 and the positive electrode terminal parts 15, and the like.

The metal plates 5 and 50 are preferably made of a copper alloy or a material that is similar thereto. This allows power to be distributed with low resistance. The metal plates 5 and 50 are made of, for example, nickel or a nickel alloy. Thus, this provides favorable weldability between the terminal contact parts formed at the metal plates 5 and 50 and the positive electrode terminal parts or negative electrode terminal parts. The surfaces of the metal plates 5 and 50 may be plated with tin or nickel. This makes it possible to prevent the surfaces of the metal plates 5 and 50 from being oxidized and rusted.

The battery cells 4 housed in the battery holder 12 are electrically connected to each other by the metal plates 5 and 50. In the examples of FIGS. 1 and 2, two battery cells 4 arranged vertically are connected in a parallel arrangement by the metal plates 5 and 50, and four sets of two battery cells 4 in the parallel arrangement are electrically connected in a series arrangement.

The metal plate 50, for example, in a flat plate shape, has parts in contact with the negative electrode terminal parts 16, formed at two sites in the vertical direction, with the metal plate 50 joined to the battery cells 4, and small holes 20 formed at the centers of the sites or in the vicinity thereof.

Figure 4:
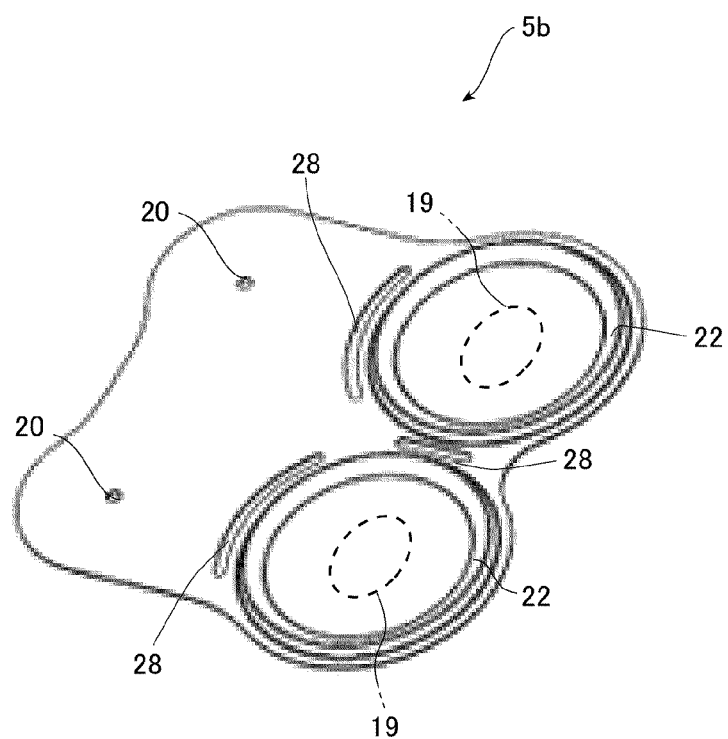
FIG. 4 is a perspective view illustrating an example of a metal plate.
Figure 5:
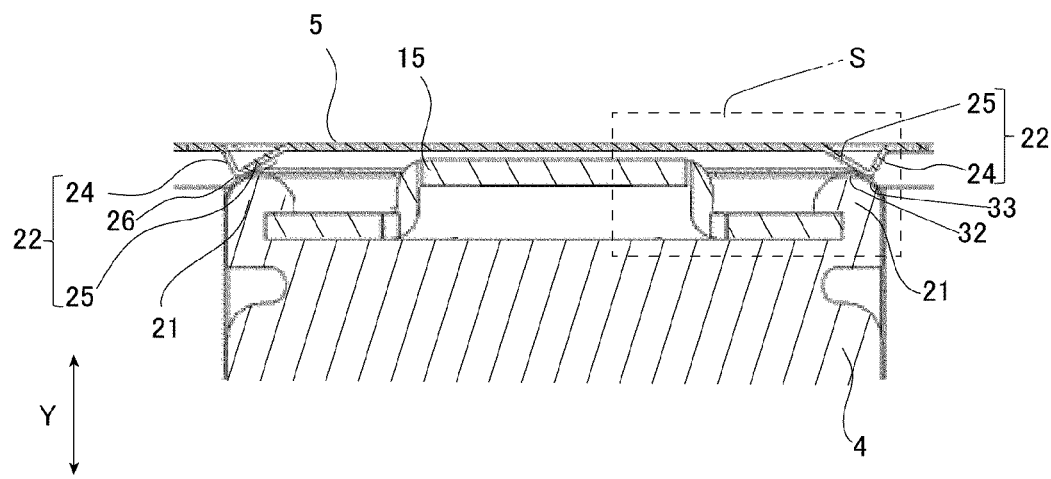
FIG. 5 includes views A and B, where view A is a schematic sectional view illustrating an example of disposing a battery cell and a metal plate, and where view B is an enlarged sectional view illustrating a part of region S surrounded by a dashed line in view A.
Figure 5:
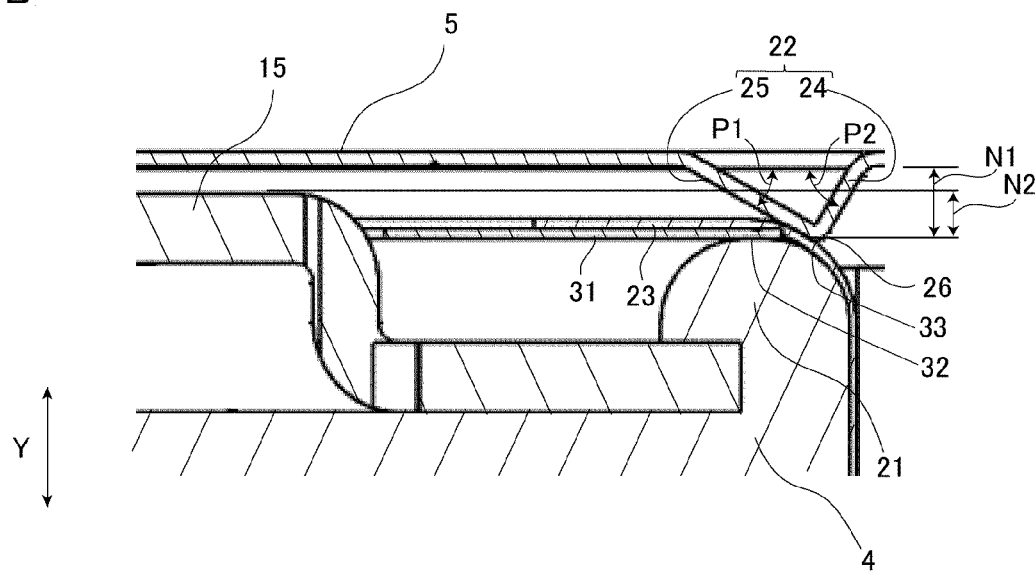

FIG. 4 is a diagram for illustrating the appearance shape of the metal plate 5 in the case of the second metal plate 5b for the metal plate 5. As illustrated in FIG. 4, the metal plate 5 has the protrusions 22 corresponding to the peripheral protrusion 21 around the terminal contact parts 19. In the examples of FIGS. 1 and 2, the first metal plate 5a and the second metal plate 5b as the metal plate 5 are provided with the protrusions 22.

The first metal plate 5a has two parts formed in the vertical direction to serve as the terminal contact parts 19 with the first metal plate 5a joined to the positive electrode terminal parts 15 of the battery cells 4. In addition, the second metal plate 5b has the protrusions 22 on the outer peripheries of the parts to serve as the respective terminal contact parts 19. The protrusion 22 is formed in a shape corresponding to the peripheral protrusion 21 described later.

For example, as illustrated in FIG. 4, the second metal plate 5b has two (a set of) parts formed in the vertical direction to serve as the terminal contact parts 19 with the second metal plate 5b joined to the positive electrode terminal parts of the battery cells 4. In addition, the second metal plate 5b has, as with the first metal plate 5a, the protrusions 22 corresponding to the peripheral protrusion 21 on the outer peripheries of the parts to serve as the terminal contact parts 19.

The second metal plate 5b has parts in contact with the negative electrode terminal parts 16, formed at two sites in the vertical direction, and small holes 20 formed at the centers of the sites or in the vicinity thereof.

The metal plate 5 has the protrusions 22 formed on the outer peripheries of the parts to serve as the terminal contact parts 19 on the face side facing the positive electrode terminal parts 15. The protrusion 22 is formed at a position and in a shape corresponding to the peripheral protrusion 21. In the examples of FIGS. 1 and 2, parts corresponding to the protrusions 22 serve as recesses 51 at a main surface of the metal plate 5 that will not face the positive electrode terminal parts 15.

In the battery pack 1, as illustrated in FIGS. 5A and 5B, the protrusion 22 and the peripheral protrusion 21 are preferably brought into contact with each other outside the protruding end 32 of the peripheral protrusion 21. In this case, in the battery pack 1, the protrusion 22 and the peripheral protrusion 21 are allowed to face each other, thereby facilitating the suppression of the positional deviation at the time of positioning the metal plate 5 with respect to the battery cell 4, and allowing the protrusion 22 and the peripheral protrusion 21 in contact with each other to be more easily formed.

The shape of the protrusion 22 is not to be considered particularly limited as long as the shape can be brought into close contact with the peripheral protrusion 21, but as shown in FIGS. 5A and 5B and the like, the protrusion 22 is preferably formed in a mountain shape with the inclination (inclination angle P1 in FIG. 5B) of an inner slope part 25 gentler than the inclination (inclination angle P2 in FIG. 5B) of an outer slope part 24 (P1<P2). The inner slope part 25 refers to a slope part formed along the face of the metal plate 5 from a region facing the positive electrode terminal part 15 outward (in a direction away from the region) to the position of the top 26 of the protrusion 22. The outer slope part 24 refers to a slope part formed from the top 26 of the protrusion 22 toward the outside of the metal plate 5 (in a direction away from the region facing the positive electrode terminal part 15).

When the protrusion 22 is formed such that the metal plate 5 meets P1<P2, the top 26 of the protrusion 22 is positioned outside the protruding end 32 of the peripheral protrusion 21 to facilitate the formation of the inner slope part 25 in contact with an outer inclined part 33 of the peripheral protrusion 21, and the positional deviation of the metal plate 5 is less likely to be caused at the time of positioning the metal plate 5 with respect to the battery cell 4. Furthermore, if the position of the metal plate 5 is somewhat deviated, any position of the inner slope part 25 in contact with the outer inclined part 33 of the peripheral protrusion 21 will be more likely to be maintained. Accordingly, when the metal plate 5 is joined to the battery cell 4, the inner slope part 25 of the protrusion 22 in close contact with the peripheral protrusion 21 is more likely to be formed. The time of positioning the metal plate 5 with respect to the battery cell 4 indicates a case where the metal plate 5 is disposed with respect to the battery cell 4 without being joined to each other (before the formation of the battery cell 4 and metal plate 5 joined to each other) as illustrated in FIGS. 5A and 5B and the like.

Figure 6:
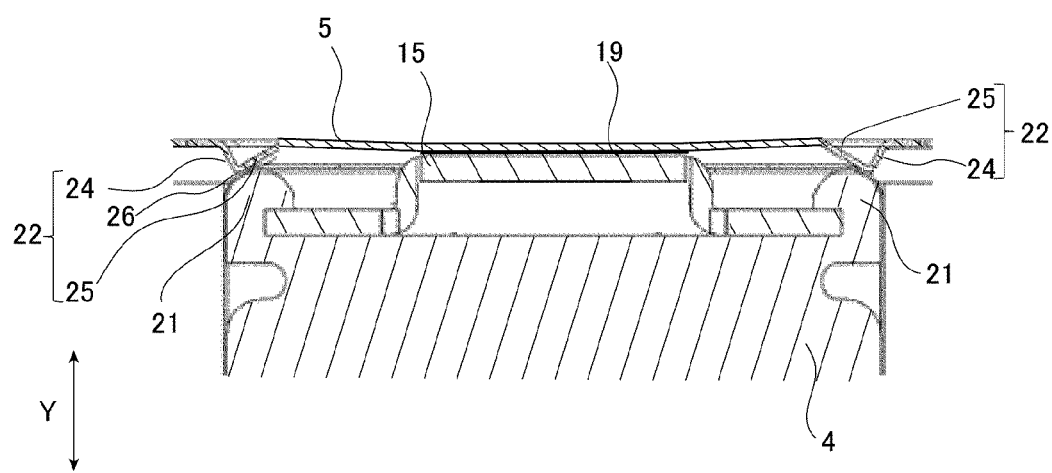
FIG. 6 is a schematic sectional view illustrating an example of the metal plate and battery cell joined.
Figure 7:
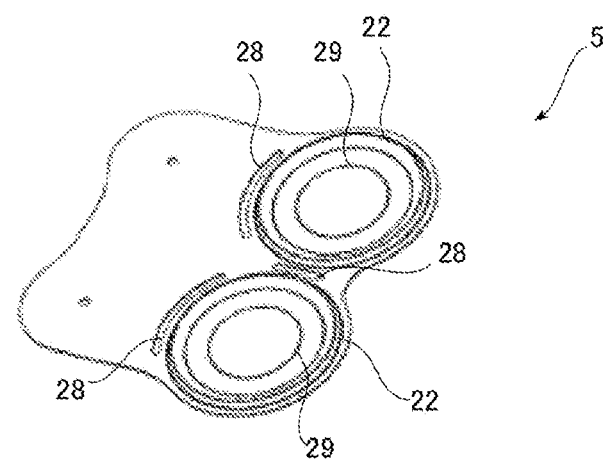
FIG. 7 includes views A and B which are perspective views illustrating examples of a case where the metal plate has a thin part formed therein.
Figure 7:
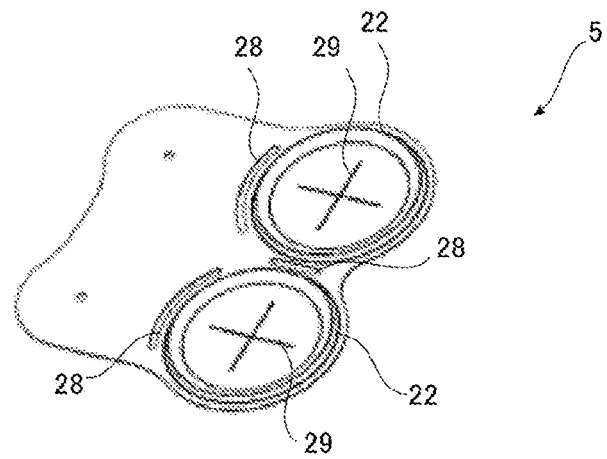

As illustrated in FIG. 5B, at the time of positioning the metal plate 5 with respect to battery cell 4, a gap is preferably formed between the main surface of metal plate 5 facing the positive electrode terminal part 15 and positive electrode terminal part 15 of battery cell 4. More specifically, at the time of positioning the metal plate 5 with respect to the battery cell 4, N1>N2 is preferably met when the height difference N1 up to the position of the top 26 of the protrusion 22 with respect to the main surface of the metal plate 5 is compared with the height difference N2 up to the position of the top 26 of the protrusion 22 with respect to the surface position of the positive electrode terminal part 15. When the shape, size, and formation position of the protrusion 22 are determined so as to form such a gap, the terminal contact part 19 is formed by pressing the metal plate 5 against the side with the positive electrode terminal part 15 of the battery cell 4 in the case of joining the battery cell 4 and the metal plate 5, and thus, a pressing force acts on the position of contact between the peripheral protrusion 21 and the protrusion 22, thereby allowing the peripheral protrusion 21 and the protrusion 22 to be more firmly brought into close contact with each other. In addition, in this case, as illustrated in FIG. 6, the metal plate 5 can be slightly warped outward along the metal plate surface around the terminal contact part 19, and the peripheral protrusion 21 and the protrusion 22 can be more firmly brought into close contact with each other. As the metal plate 5 and the positive electrode terminal part 15 of the battery cell 4 are joined to each other, the peripheral protrusion 21 and the protrusion 22 are brought into close contact with each other to exhibit a waterproof function.

The method for joining the metal plate 5 and the positive electrode terminal part 15 of the battery cell 4 is not to be considered particularly limited, and examples of the method include resistance welding and laser welding.

In the battery pack 1, as shown in FIGS. 9A and 9B, the second insulating part 27 is preferably further provided between the protrusions 22 and the first insulating part 23. The second insulating part 27 further provided in the battery pack 1 makes it possible to, if the first insulating part 23 is damaged, keep an insulating member interposed between the metal plate 5 and the peripheral protrusion 21 of the battery cell 4.

The second insulating part 27 is not to be considered particularly limited, but as illustrated in FIG. 9A, the second insulating part 27 is an insulating layer formed on at least a part of the protrusions 22 by coating or printing. When the second insulating part 27 is an insulating layer formed on at least a part of the protrusions 22 of the metal plate 5, the number of components can be kept from being increased. The material constituting the insulating layer is not to be considered particularly limited, and for example, ultraviolet curable resins with insulating property can be used. It is to be noted that the region with the second insulating part 27 is formed is illustrated as a hatched region in FIG. 9A.

In the battery pack 1, as illustrated in FIG. 4, the outer periphery of the protrusions 22 of the metal plate 5 are, as part thereof, preferably provided with slits 28. With the slits 28 provided at the outer periphery of the protrusions 22, if a part of the metal plate 5 is strained when the metal plate 5 is joined to the battery cell 4 and then warped outward along the metal plate surface about the terminal contact part 19 (see FIG. 6), the slits 28 will buffer the strain to allow the strain to be kept from spreading to the whole metal plate 5. For example, in the example of FIG. 4, with the slits 28 provided, if strain is generated around the terminal contact parts 19 when the metal plate 5 is joined to the battery cells 4, the strain is buffered by the slit 28, thereby allowing the strain around the terminal contact parts 19 to be kept from spreading to the whole metal plate 5.

The size, position, and the like of the slit 28 are not to be considered particularly limited as long as the outer periphery of the protrusion 22 in the metal plate 5 is, as part thereof, provided with the slit 28, but are considered a size, a position, and the like such that the strain of the metal plate 5 can be buffered. The number of the slits 28 formed is not to be considered particularly limited, and in the example of FIG. 4, the slits 28 are provided at three sites with respect to the outer periphery of the protrusions 22 at one site.

Figure 8:
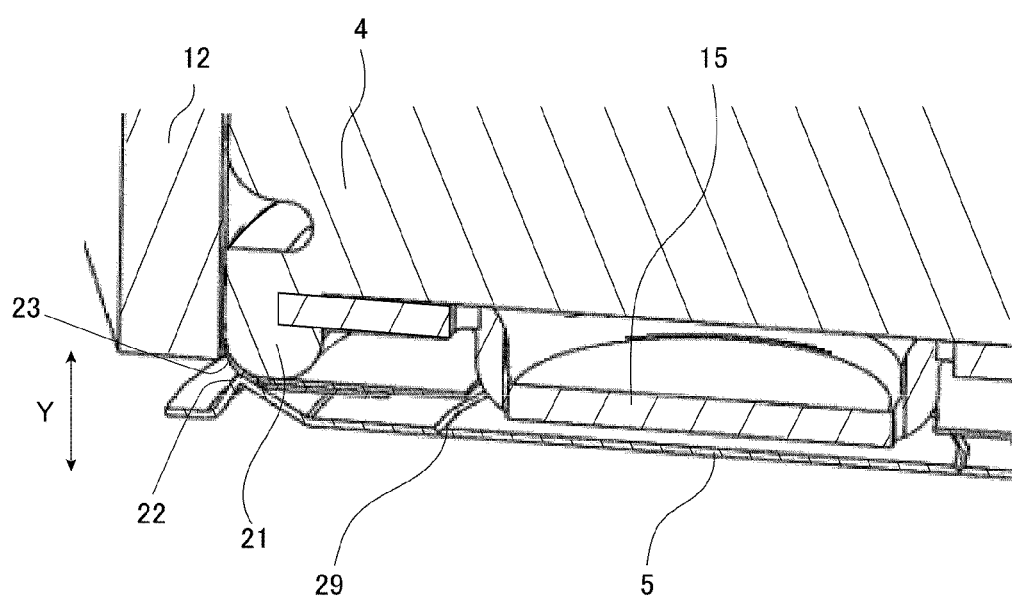
FIG. 8 is a schematic sectional view illustrating an example of disposing a battery cell and the metal plate illustrated in view A of FIG. 7.
Figure 9:
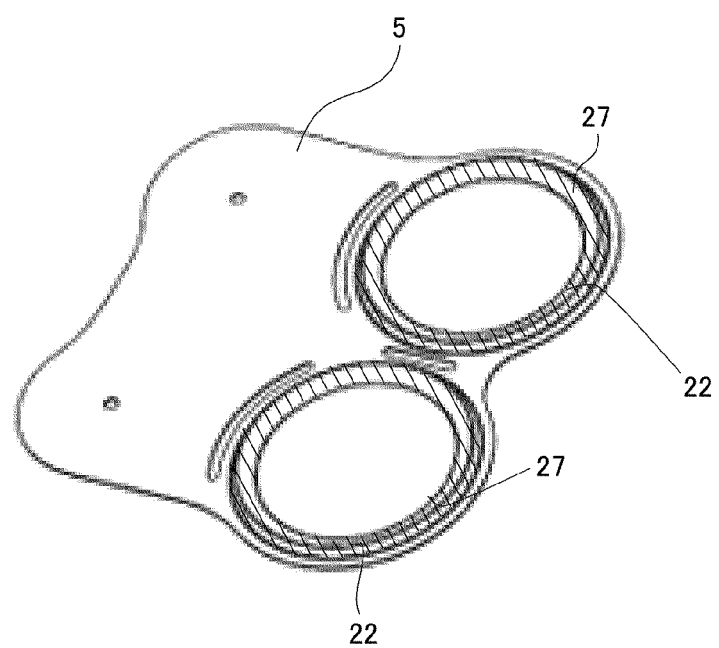
FIG. 9 includes views A and B, where view A is a perspective view illustrating an example of a case where the metal plate has a second insulating part provided, and where view B is a schematic sectional view illustrating an example of disposing a battery cell and the metal plate illustrated in view A.
Figure 9:
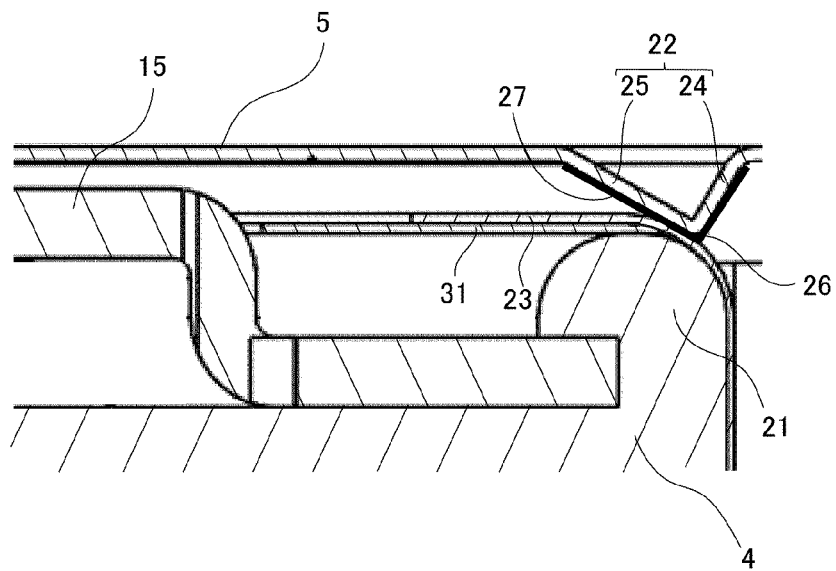

As illustrated in FIGS. 7A, 7B, and 8, the metal plate 5 is preferably provided with a thin part 29 inside the protrusion 22. In the example of FIGS. 7A and 8, the thin part 29 is formed by a groove that is V-shaped in section, formed along the protrusion 22. In addition, in this example, the groove is formed in the main surface of the metal plate 5 facing the battery cell 4. It is to be noted that the shape of the groove that forms the thin part 29 illustrated in FIG. 8 is considered by way of example, and the shape of the groove is not to be considered limited thereto.

With the thin part 29 provided in the battery pack 1, if any abnormality in the battery cell 4 causes gas to be ejected from the battery cell 4, the metal plate 5 is cleaved at the thin part 29 by the pressing force of the gas, thereby allowing the gas to be easily released to the outside, and thus allowing the safety of the battery pack 1 to be improved.

The shape of the thin part 29 is formed in a circular shape in FIG. 7A, but the shape of the thin part 29 is not limited thereto, and may be formed in a cross shape as illustrated in FIG. 7B, for example.

The circuit board 3 is electrically connected to the external connection terminal 30 of the battery pack 1. In the example of FIG. 1, the circuit board 3 and the external connection terminal 30 are electrically connected via a wiring (not shown). The circuit board 3 is electrically connected to the board connection terminal 18 of the metal plate 5, and is equipped with an electric circuit. The electric circuit is formed such that electric power from the battery cells 4 can be supplied from the external connection terminal 30 to the outside.

In this regard, a specific example of the battery cell 4 stored in the battery pack 1 will be further described. An example of the battery cell 4 will be described by taking, as an example, a case where the battery cell 4 is a cylindrical lithium ion battery.

FIG. 10 is a schematic sectional view of a lithium ion battery 40 as the battery cell 4. The battery cell 4 exemplified in FIG. 10 is the cylindrical lithium ion battery 40 that has an electrode wound body 120 is housed inside a battery can 111.

The lithium ion battery 40 includes a pair of insulators 112 and 113 and an electrode wound body 120 inside the cylindrical battery can 111. The lithium ion battery 40 may further include any one of, or two or more of a positive temperature coefficient (PTC) element, a reinforcing member, and the like inside the battery can 111.

The battery can 111 is a member that mainly houses the electrode wound body 120. The battery can 111 is a cylindrical container with one end thereof opened and the other end thereof closed. More specifically, the battery can 111 has an opened end (open end 111N). The battery can 111 contains any one of, or two or more of metal materials such as iron, aluminum, and alloys thereof. The surface of the battery can 111 may be, however, plated with any one of, or two or more of metal materials such as nickel.

The insulators 112 and 113 are sheet-shaped members that each have a surface substantially perpendicular to the winding axis direction (vertical direction in FIG. 10) of the electrode wound body 120. The insulators 112 and 113 are disposed so as to sandwich the electrode wound body 120 therebetween. As a material for the insulators 112 and 113, a polyethylene terephthalate (PET), a polypropylene (PP), bakelite, or the like is used. Examples of bakelite include paper bakelite and cloth bakelite produced by applying a phenolic resin to paper or cloth and then heating the paper or cloth.

At the open end 111N of the battery can 111, the battery cover 114 and the safety valve mechanism 130 are crimped with the gasket 115 to form a crimped structure 111R (crimped structure). Thus, with the electrode wound body 120 and the like housed inside the battery can 111, the battery can 111 is sealed.

The crimped structure 111R of the battery can 111 is formed, thereby forming a bent part 111P protruded from the position of the battery cover surface so as to surround the outer periphery of the battery cover 114 with the battery cover 114 attached to the battery can 111. The bent part 111P constitutes the peripheral protrusion 21 described above. The bent part 111P as the peripheral protrusion 21 is formed in a curved shape, and formed in a U shape in section in the example of FIG. 10.

The battery cover 114 is a member that closes the open end 111N of the battery can 111 with the electrode wound body 120 and the like housed inside the battery can 111, and is made of iron plated with nickel. The battery cover 114 contains the same material as the material that forms the battery can 111. The central region of the battery cover 114 has a protruding part protruding in the vertical direction in FIG. 10.

The lithium ion battery 40 has an insulating exterior tube 153 provided on the outer peripheral surface of the battery can 111 as the first insulating part 23 described above. The exterior tube 153 covers the outer peripheral surface of the battery can 111 and the bent part 111P as the peripheral protrusion 21, and further extends from the bent part 111P toward the protruding part of the battery cover 114. The extended end of the exterior tube 153 is located between the protruding part of the battery cover 114 and the crimped structure 111R.

The method for attaching the exterior tube 153 to the battery can 111 is not particularly limited, but for example, heating is performed with the exterior tube 153 disposed outside the battery can 111 to shrink the exterior tube 153, thereby allowing the exterior tube to be brought into close contact with the outer periphery of the battery can 111.

The lithium ion battery 40 may further be provided with a washer as described above (not shown in FIG. 10). The washer is disposed on the outer periphery of the protruding part of the battery cover 114.

The gasket 115 is a member mainly interposed between the bent part 111P of the battery can 111 (also referred to as a crimped part) and the battery cover 114 to seal the gap between the bent part 111P and the battery cover 114. For example, asphalt or the like may be applied to the surface of the gasket 115.

The gasket 115 contains an insulating material. The types of the insulating materials are not particularly limited, and may be a polymer material such as a polybutylene terephthalate (PBT) and a polypropylene (PP). This is because the gap between the bent part 111P to serve as the peripheral protrusion 21 and the battery cover 114 is sufficiently sealed while the battery can 111 and the battery cover 114 are electrically separated from each other.

The safety valve mechanism 130 mainly releases the sealed state of the battery can 111 to release the pressure (internal pressure) inside the battery can 111, if necessary, when the internal pressure is increased. The cause of the increase in the internal pressure of the battery can 111 is a gas generated due to a decomposition reaction of an electrolytic solution during charging or discharging.

The safety valve mechanism 130 has a safety cover 131 that is a substantially circular plate-shaped member, which is also referred to as a valve body. The safety cover 131 is made of, for example, aluminum. As illustrated in FIG. 1, a central part of the safety cover 131 may have a protruding part protruding toward the electrode wound body 120.

For the cylindrical lithium ion battery, a band-shaped positive electrode 121 and a band-shaped negative electrode 122 are spirally wound with a separator 123 interposed therebetween, impregnated with an electrolytic solution, and housed in the battery can 111. Although not illustrated, the positive electrode 121 and the negative electrode 122 are obtained by respectively forming a positive electrode active material layer and a negative electrode active material layer on one side or both sides of a positive electrode current collector and a negative electrode current collector. The material of the positive electrode current collector is a metal foil containing aluminum or an aluminum alloy. The material of the negative electrode current collector is a metal foil containing nickel, a nickel alloy, copper, or a copper alloy. The separator 123 is a porous and insulating film, which enables transfer of lithium ions while electrically insulating the positive electrode 121 and the negative electrode 122.

The center of the electrode wound body 120 is, as illustrated in FIG. 10, provided with a space (central space 120C) produced when the positive electrode 121, the negative electrode 122, and the separator 123 are wound is provided, and a center pin 124 is inserted into the central space 120C. The center pin 124 can be, however, omitted.

A positive electrode lead 125 is connected to the positive electrode 121, and a negative electrode lead 126 is connected to the negative electrode 122 (see FIG. 10). The positive electrode lead 125 includes a conductive material such as aluminum. The positive electrode lead 125 is electrically connected to the battery cover 114 via the safety valve mechanism 130. The negative electrode lead 126 includes a conductive material such as nickel. The negative electrode lead 126 is electrically connected to the battery can 111. The respective detailed configurations and materials of the positive electrode 121, negative electrode 122, separator 123, and electrolytic solution will be described later.

The positive electrode active material layer includes at least a positive electrode material (positive electrode active material) capable of occluding and releasing lithium, and may further include a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder includes a synthetic rubber or a polymer compounds. The synthetic rubbers may be styrene-butadiene rubbers, fluorine rubbers, ethylene propylene diene, and the like. Examples of the polymer compounds include a polyvinylidene fluoride (PVdF) and a polyimide.

The positive electrode conductive agent may be a carbon material such as graphite, carbon black, acetylene black, or Ketjen black. The positive electrode conductive agent may be, however, a metal material and a conductive polymer.

The surface of the negative electrode current collector is preferably roughened for improving the adhesion to the negative electrode active material layer. The negative electrode active material layer includes at least a negative electrode material (negative electrode active material) capable of occluding and releasing lithium, and may further include a negative electrode binder, a negative electrode conductive agent, and the like.

The negative electrode material incudes, for example, a carbon material. The carbon materials may be, for example, graphitizable carbon, non-graphitizable carbon, graphite, low-crystallinity carbon, or amorphous carbon. The shape of the carbon materials has a fibrous, spherical, granular, or scaly shape.

The negative electrode material includes, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include a silicon oxide ($SiO_x$ ($0<x\leq2$)), a silicon carbide (SiC) or an alloy of carbon and silicon, and a lithium titanate (LTO).

The separator 123 is a porous membrane containing a resin, and may be a laminated film of two or more porous films. The resin may be a polypropylene and a polyethylene. The separator 123 may include a resin layer on one or both surfaces of the porous membrane as a substrate layer. This is because the adhesion of the separator 123 to each of the positive electrode 121 and the negative electrode 122 is improved, thus keeping the electrode wound body 120 from warping.

The resin layer contains a resin such as PVdF. In the case of forming the resin layer, a solution in which a resin is dissolved in an organic solvent or the like is applied to the substrate layer, and then the substrate layer is dried. It is to be noted that after immersing the substrate layer in the solution, the substrate layer may be dried. The resin layer preferably includes inorganic particles or organic particles from the viewpoint of improving the heat resistance and the safety of the battery. The type of the inorganic particles is an aluminum oxide, an aluminum nitride, an aluminum hydroxide, a magnesium hydroxide, boehmite, talc, silica, mica, or the like. In place of the resin layer, a surface layer containing inorganic particles as a main component may be used, which is formed by a sputtering method, an atomic layer deposition (ALD) method, or the like.

The electrolytic solution includes a solvent and an electrolyte salt, and may further include an additive and the like, if necessary. The solvent is a nonaqueous solvent such as an organic solvent, or water. The electrolytic solution including a nonaqueous solvent is referred to as a nonaqueous electrolytic solution. The nonaqueous solvent may be a cyclic carbonate, a chain carbonate, a lactone, a chain carboxylate, a nitrile (mononitrile), or the like.

Typical examples of the electrolyte salt are lithium salts, but a salt other than lithium salts may be contained. The lithium salt may be lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), dilithium hexafluorosilicate ($Li_2SF_6$), and the like. These salts can also be used in mixture, above all, the use of $LiPF_6$ and $LiBF_4$ in mixture is preferred from the viewpoint of improving battery characteristics.

According to an embodiment, for example, the following effects can be obtained.

For such a cylindrical battery as shown in the example of FIG. 10, the central region of the battery cover 114 is intended for a positive electrode, the part with the crimped structure 111R is intended for a negative electrode, and the positive electrode and the negative electrode are close to each other. When water droplets adhere from the negative electrode to the positive electrode so as to straddle the part from the crimped structure part to the center of the battery cover (referred to as a proximity part), an electrical corrosion may be possibly caused. For this reason, the waterproof function of a battery pack that houses the cylindrical battery has been particularly required to prevent entry of moisture into the proximity part.

According to an embodiment, the protrusions 22 of the metal plate 5 are disposed so as to face the bent part of the crimped structure 111R (the peripheral protrusion of the battery). Thus, the entry of moisture into the proximity part can be prevented, and the waterproof function of the battery pack can be achieved.

Further, according to an embodiment, the peripheral protrusion of the battery and the protrusion of the metal plate are disposed so as to face each other, thereby allowing the waterproof function of the battery pack to be achieved without using any waterproof component such as a cushioning material or a packing.

In addition, because of no waterproof component used, the incorporation of each component can be simplified, and malfunctions due to defective incorporation can be prevented. Furthermore, because of no waterproof component used, the component cost can be reduced.

The positional deviation of the metal plate can be suppressed by positioning the protrusions of the metal plate with a jig and welding the positive electrode side first.

In the example of the battery pack 1 according to the first embodiment, the positive electrode terminal part 15 is formed in a shape protruding from the center of one end surface of the battery cell 4, whereas the negative electrode terminal part 16 is formed in a planar shape on the side with the other end surface of the battery cell 4. The battery cell 4 housed in the battery pack 1 is not limited to this example, and the negative electrode terminal part may be formed in a shape protruding from the center of one end surface of the battery cell, whereas the positive electrode terminal part may be formed in a planar shape on the side with the other end surface of the battery cell. In the battery pack according to the second embodiment, the metal plate corresponding to the metal plate 5 is connected to the negative electrode terminal of the battery cell, and the metal plate has a protrusion corresponding to the peripheral protrusion of the negative electrode terminal.

In the application example, an electric tool including the above-described battery pack will be described according to an embodiment.

Figure 11:
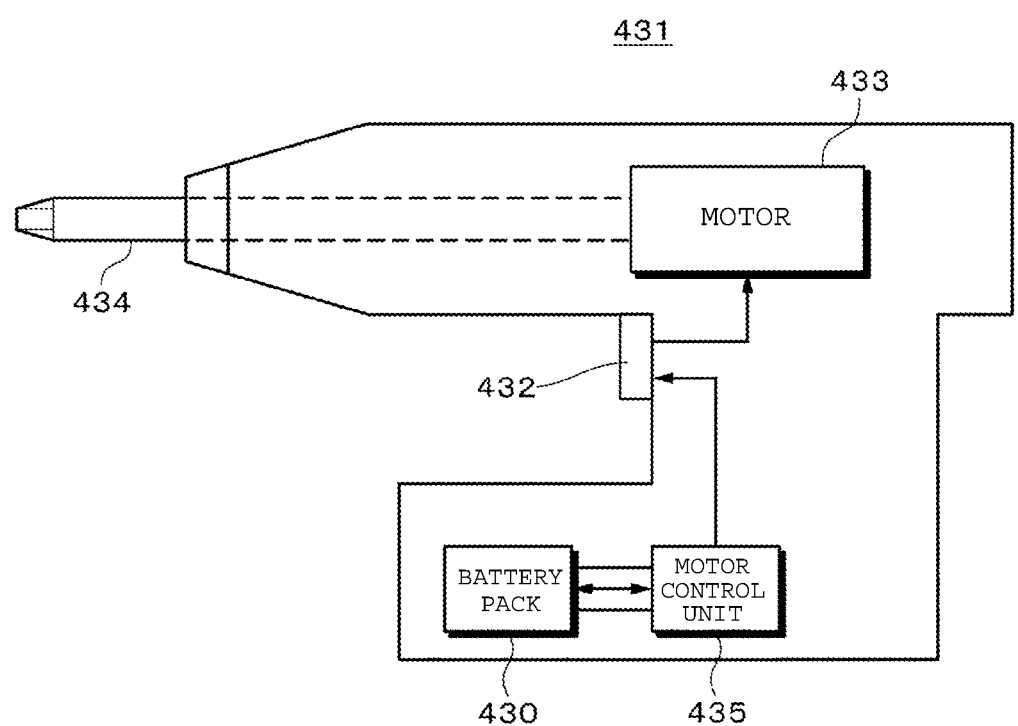
FIG. 11 is a diagram for illustrating an application example of a battery pack.

An example of an electric driver as an electric tool to which the present technology can be applied will be schematically described with reference to FIG. 11. An electric driver 431 is provided with a motor 433 that transmits rotative power to a shaft 434 and a trigger switch 432 operated by a user. A battery pack 430 and a motor control unit 435 are housed in a lower housing of a handle of the electric driver 431. The battery pack 430 is built in the electric driver, or detachable from the electric driver 431. The battery pack according to an embodiment can be used as the battery pack 430.

The battery pack 430 and the motor control unit 435 each may include a microcomputer (not shown), such that charge/discharge information of the battery pack 430 can be communicated with each other. The motor control unit 435 can control the operation of the motor 433, and cut off the power supply to the motor 433 at the time of abnormality such as overdischarge.

Electric tools for use outdoors are used in severe situations such as being exposed to wind and rain. If the battery pack is placed under such a severe situation, the protrusion of the metal plate in close contact with the peripheral protrusion of the battery is maintained, thereby enhancing the waterproofness of the battery pack.

While the present application has been described herein, the present application is not to be considered limited thereto, and it is possible to make various modifications thereof.

For example, the configurations, methods, steps, shapes, materials, and the like cited in the above-described embodiments and application example are considered by way of example only, and configurations, methods, steps, shapes, materials, and the like may be used which are different from the foregoing, if necessary. Further, the configurations, methods, steps, shapes, materials, and the like in the above-described embodiments and examples can be combined with each other, without departing from the scope of the present application.

DESCRIPTION OF REFERENCE SYMBOLS

1: Battery pack
2: Exterior case
2a: Upper case
2b: Lower case
4: Battery cell
5, 50: Metal plate
15: Positive electrode terminal part
16: Negative electrode terminal part
18: Board connection terminal
23: First insulating part
24: Outer slope part
25: Inner slope part
26: Top of protrusion
27: Second insulating part
28: Slit
29: Thin part
31: Washer
430: Battery pack
431: Electric driver It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
    an exterior case;
    a cylindrical battery cell including a positive electrode terminal part at one end and a negative electrode terminal part at the other end; and
    a metal plate connected to the positive electrode terminal part or the negative electrode terminal part,
    wherein
    the battery cell includes a peripheral protrusion around the positive electrode terminal part or the negative electrode terminal part,
    the metal plate includes a protrusion that faces the peripheral protrusion,
    the protrusion is disposed in close contact with a whole periphery of the peripheral protrusion, with a first insulating part interposed therebetween and wherein the protrusion has a slope formed outward from a region where the metal plate faces the positive electrode terminal part.

2. The battery pack according to claim 1, wherein a side surface of the battery cell and the peripheral protrusion are covered with the first insulating part.

3. The battery pack according to claim 1, wherein a part of an outer periphery of the protrusion is provided with a slit.

4. The battery pack according to claim 1, wherein a second insulating part is further provided between the protrusion and the first insulating part.

5. The battery pack according to claim 4, wherein the second insulating part is an insulating layer formed on at least a part of the protrusion by coating or printing.

6. The battery pack according to claim 1, wherein a thin part is provided inside the protrusion of the metal plate.

7. The battery pack according to claim 6, wherein the thin part is formed along the protrusion.

8. The battery pack according to claim 6, wherein the thin part has a cross shape.

9. The battery pack according to claim 1, wherein the protrusion and the peripheral protrusion are in contact with each other outside a protruding end of the peripheral protrusion.

10. An electric tool comprising the battery pack according to claim 1.

* * * * *